Sept. 2, 1969        A. E. ANDERSON        3,465,127

FREQUENCY CONTROLLED OVEN

Filed Oct. 9, 1967

*INVENTOR.*
ALBERT E. ANDERSON

BY *Donald W. Phillips*

ATTORNEY

United States Patent Office 3,465,127
Patented Sept. 2, 1969

3,465,127
FREQUENCY CONTROLLED OVEN
Albert E. Anderson, Cedar Rapids, Iowa, assignor to Collins Radio Company, Cedar Rapids, Iowa, a corporation of Iowa
Filed Oct. 9, 1967, Ser. No. 673,690
Int. Cl. H05b 1/02
U.S. Cl. 219—494          6 Claims

ABSTRACT OF THE DISCLOSURE

A frequency controlled oven employing two oscillators, the first controlled by a crystal whose change of frequency with temperature at the desired oven temperature is small, the second oscillator controlled by a crystal whose change of frequency with oven temperature is large. A phase detector compares the outputs of the two oscillators to produce D-C voltage which controls the frequency of said first oscilaltor to that of the second oscillator.

---

This invention relates generally to frequency controlled ovens and, more particularly, to a frequency controlled oven employing two crystals within the oven which function to control the temperature thereof.

There are in the prior art many structures for controlling oven temperatures. One of the most common type structures employs heat sensitive elements, generally thermostats, within the oven which respond to temperature changes to produce a signal indicating such change of temperature from a desired value. One of the principal difficulties with such arrangements is the relatively long time lag between a deviation of oven temperature and the correction thereof. This time lag results in some oscillation of the temperature about the desired value. Such oscillation, while perhaps only a few tenths of a degree or less in magnitude, is sufficiently great to produce serious problems in certain precision instrument equipments such as, for example, crystal controlled oscillators.

Structures employing crystals have also been utilized to control oven temperature. More specifically, crystals have a characteristic known as a temperature dip. Such temperature dips manifest themselves in unusual activity of the crystal or complete discontinuity of oscillation of the crystal at certain temperatures. Ordinarily, such temperature dips are regarded as undesirable, but can be employed as a basis for a crystal controlled oven. The principal disadvantages involved in employing the temperature dip phenomena are manufacturing difficulties and the fact that such temperature dips are not always sufficiently well defined to provide a high accuracy of temperature control.

It is the primary object of the present invention to provide accurate temperature control of an oven employing crystals and in which thermal hunting of the temperature is minimized.

Another object of the invention is to provide an oven whose temperature is accurately and reliably controlled by means of two crystals.

A further object of the invention is to provide accurate temperature control of an oven by the use of two crystals whose temperature responsive curves intersect each other at almost a 90° angle at the temperature to which the oven is to be controlled, thereby providing pronounced changes in phase of the signals generated in said two crystals with a relatively small deviation of temperature from the desired temperature.

A further object of the invention is the improvement of crystal controlled oven, generally.

In accordance with the invention, there is provided within the oven first and second crystals with the first crystal cut so that at the desired temperature of the oven, the rate of change of frequency with temperature is relatively small, and with the second crystal cut so that at said desired oven temperature the rate of change of frequency with temperature is relatively large. The said first and second crystals each form the frequency control element for first and second oscillators, respectively. The said second oscillator contains a voltage varaible reactance as a means of frequency control, and is commonly known as a voltage controlled crystal oscilaltor, or VCXO. A phase detector means is constructed to respond to the outputs of said two oscillators to produce a D-C output voltage whose amplitude and polarity vary as the phase of the signals from the two oscillators. The D-C output voltage of the phase detector is supplied, through an integrating network, to the VCXO and to a suitable heater element o fthe oven through appropriate amplification means.

The above-mentioned and other objects and features of the invention will be more fully understood from the following description thereof when read in conjunction with the drawings in which.

Figure 1:
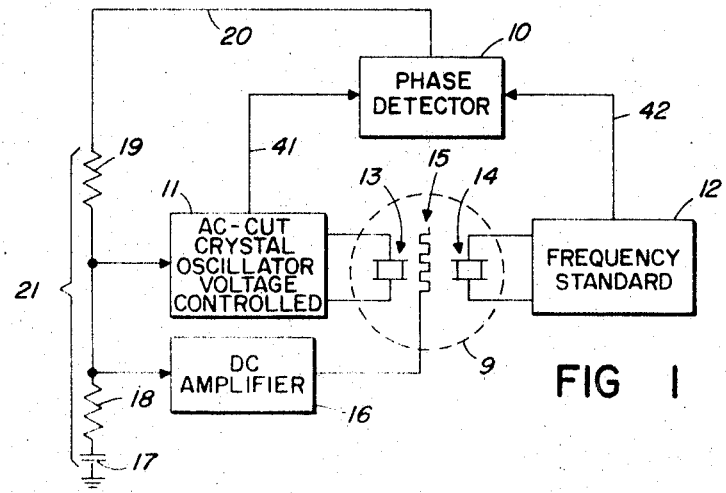
FIG. 1 is a combination block-schematic diagram of the invention.

Referring now to FIG. 1, an oven 9 contains a heater element 15 and two crystals 13 and 14 which are positioned within the oven 9 at points most suitable for indicating the actual temperature of that portion of the oven wherein the temperature is most critical.

Figure 3:
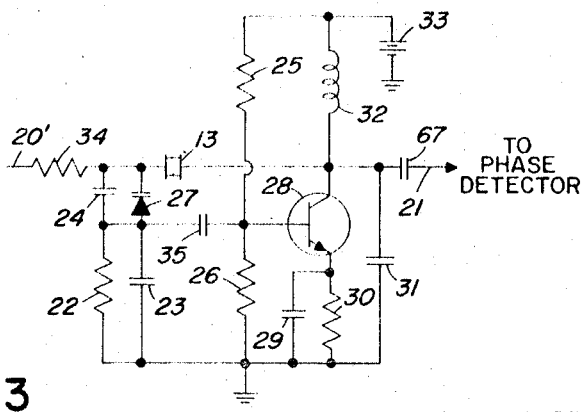
FIG. 3 is a schematic diagram of a crystal oscillator circuit which can be employed in the circuit.

Each of the crystals 13 and 14 form the basic element of an oscillator. Fo rexample, the crystal 14 forms the frequency control element for an oscillator circuit 12 which is shown in block diagram form but which can be one of many different types of crystal controlled oscillators. The crystal 13 forms a frequency control element for oscillator 11 which also can be any one of many well-known types of voltage-controlled crystal oscillators. A specific type oscillator circuit which may be employed in the block 11 is shown in FIG. 3.

The outputs of the oscillators 11 and 12 are supplied to a phase detector 10 which compares the phases of the two received signals to produce a D-C output voltage on lead 20 whose amplitude and polarity indicate the degree and polarity of the phase difference between the two signals supplied thereto. Said D-C signal is supplied through an integrating network 21, consisting of capacitor 17 and resistors 18 and 19, to VCXO 11 and D-C amplifier 16. The output of the D-C amplifier 16 is supplied to heater element 15.

Should the temperature of the oven 9 drop below the desired value, the D-C output of phase detector 10 is positive in nature and will pass through integrating network 21 to D-C amplifier 16 which, in turn, will respond thereto to provide increased energy output to heater element 15, thereby raising the temperature of the oven towards the desired value.

On the other hand, if the temperature of the oven is too high, the output of phase detector 20 will be a negative D-C voltage and the D-C amplifier 16 will function to supply less energy to heater element 15, and thereby reduce the temperature of the oven towards the desired value.

It is to be noted that the circuit of FIG. 1 is operative either well above or below the desired operating temperature, by means of integrating network 21 and the voltage controlled characteristic of VCXO 11. The thermal control loop, provided by phase detector 10, D-C amplifier 16 and heater 15, would be operative only at the desired temperature, and then only if the time constant of the thermal loop were short enough to maintain phase lock. Above or below the desired temperature, the thermal loop by itself would have no way of sensing the direction of the error. The addition of the voltage controlled loop is an important feature of this invention, as it provides the necessary direction sensing capability, provides the capability of pulling the frequency of the VCXO in the desired direction before phase lock is reached, and by means of its short time constant holds the phase lock over a much broader region, thereby giving the thermal loop time to make the necessary temperature correction.

Figure 2:
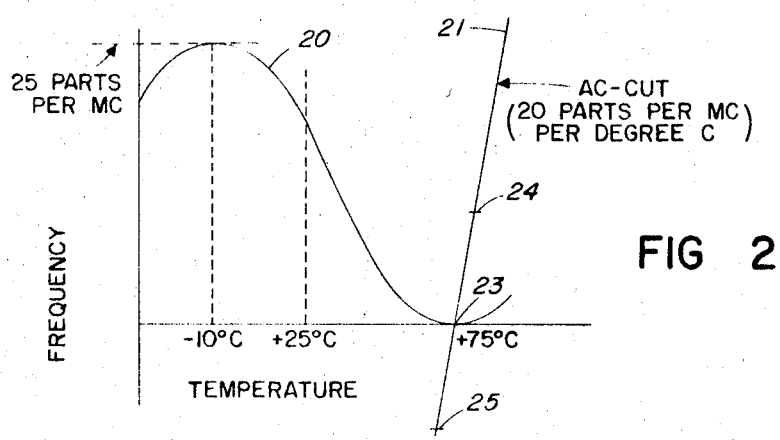
FIG. 2 shows the frequency vs. temperature characteristics of the two crystals employed in the invention.

Referring now to FIG. 2, there is shown frequency vs. temperature curves for the two crystals 13 and 14 of FIG. 1. More specifically, curve 20 of FIG. 2 represents the temperature-frequency response of crystal 14, and curve 21 represents the temperature-frequency response of crystal 13. The temperature-frequency response curve 21 is obtained by cutting crystal 13 in a manner well known in the art, and may vary from an AC cut to a Y cut, depending on the shape desired. The actual cut of the crystals is not important, the important feature being that they have different temperature coefficients at the desired operating temperature. It can be seen from curve 21 that such a cut provides a marked change in frequency for a given change in temperature. Specifically, the change in frequency for an AC-cut crystal approximately 20 cycles per megacycle per degree centigrade in that portion of the temperature frequency response curve near the intersection 23 shown in FIG. 2. On the other hand, near the intersecting point 23 the rate of change of frequency with temperature for crystal 14, which is represented by curve 20, is very small and, at point 23, is substantially zero.

The two crystals 13 and 14 of FIG. 1 are selective so that the intersecting point 23 of their frequency-temperature response curves represent the desired frequency (75° C.) of the oven. At this point 23 the frequency of the two crystals is exactly the same and phase lock of the two frequencies can be obtained by means of phase detector 10 and the feedback circuit to VCXO 11 and through amplifier 16 to heater 15 of FIG. 1. If, however, the temperature increases or decreases above or below the desired 75° C. temperature shown in FIG. 2, the frequency of crystal 13 will tend to change markedly, thereby changing phase, whereas the frequency of the crystal 14 will change very little.

Specifically, for purposes of discussion, assume that the temperature of the oven 9 increases above the desired temperature of 75° C. The frequency of crystal 13 will then tend to increase, but will be held in phase lock by the voltage controlled phase locked loop. The resulting increase in phase error, however, will supply a correcting signal to amplifier 16, reducing its output and thereby lowering the oven temperature.

A similar but opposite action takes place when the temperature of oven 9 drops below the desired value. More specifically, assume that the temperature of the oven decreases below the desired temperature. The frequency of the crystal 13 will then tend to decrease with a resultant change in phase relation to the output of crystal 14, and thereby provide an increase in the D-C output of the phase detector 10. Such an increased D-C output voltage is supplied through D-C amplifier 16 to heater 15, thereby increasing the amount of wattage supplied to said heater element 15 and also increasing the temperature of the oven upwards of the desired value.

It is to be specifically noted that the only temperature at which phase lock between the outputs of oscillators 11 and 12 of FIG. 1 can occur with zero phase error is at 75° C. as identified by the point 23 in FIG. 2. Thus the temperature of the oven is controlled by the temperature characteristic of the two crystals, which is a substantially unchangeable characteristic. Worded in another way, the intersection between the two temperature-frequency curves of the two crystals 13 and 14 is the same regardless of whether the temperature decreases to that point or increases to the point 23.

As discussed above, the circuit of FIG. 1 with the voltage controlled loop open becomes operable only after the temperature of the oven has attained the approximate desired value so that the frequencies of oscillators 11 and 12 are substantially the same.

With such limitation in mind, the operability of the thermal loop of FIG. 1 can be said to exist between the two limits represented by the short lines 24 and 25 of FIG. 2. If the frequency difference between the outputs of oscillators 11 and 12 becomes greater than represented by the limits 24 and 25 of FIG. 2, some other means, such as the voltage controlled phase locked loop, is required to detect such difference in frequency and to pull in the temperature of the oven to limits within the scope of the thermal loop of FIG. 1. There are many other structures available in the art for detecting and for making a coarse correction for such relatively large differences in frequency.

It should be noted that in the aforementioned voltage controlled phase lock loop, the D-C output voltage derived from the output of the phase discriminator is applied to a voltage responsive reactance in the oscillator to change the frequency thereof for pull-in purposes. Such a voltage variable reactance might be, for example, a varicap or a reactance tube. In the present invention, the D-C voltage output from the phase detector 10 is also supplied directly to D-C amplifier 16 which, in turn, supplies a current to heating element 15. The heating element then either increases or decreases the temperature of the oven depending upon the polarity of the derived D-C voltage to change the frequency of the crystal towards the desired value, thereby regulating the output frequency of oscillator 11.

Referring now to FIG. 3, there is shown a detailed schematic diagram of a circuit which can be used in the oscillator of block 11 of FIG. 1. The input circuit of FIG. 3 is via lead 20' and comes from the phase detector 10 of FIG. 1. Such input is applied across varicap 27 and resistors 22 and 34, which are connected in series. By definition, the capacitance of varicap 27 is changed in accordance with the value of the D-C voltage supplied thereacross and thereby changes the resonant frequency of the circuit including varicap 27, crystal 13', and capacitors 23, 24, and 31, all combining to form a pi network in the oscillator circuit, which also includes the transistor 28. The transistor 28 has an emitter connected to ground through the parallel combination of resistor 30 and bypass capacitor 29. The output of the circuit can be taken from the collector of transistor 28 and supplied to the phase detector 10 of FIG. 1 through a coupling capacitor 67 and lead 21.

The remaining components of the circuit of FIG. 3 include capacitor 24 which is in parallel with varicap 27 to bring the total capacitance of the circuit to a required value for overall oscillator circuit operation. Inductor 32 is a choke connecting the B+ power supply source 33 to the collector of the transistor 28. Resistors 25 and 26 form a voltage divider circuit to bias the base of transistor 28 to a desired value for oscillator operation. Capacitor 35 serves to isolate the D-C control voltage on varicap 27 from the D-C base bias of transistor 28.

It is to be understood that the form of the invention described and claimed herein is but a preferred embodiment thereof and that various changes may be made in circuit arrangement and application without departing from the spirit or scope of the invention.

I claim:

1. Frequency controlled oven means having a nominal operating temperature and comprising:
    an oven with a heater element;

first crystal oscillator means comprising first crystal means;
second crystal oscillator means comprising second crystal means;
said first crystal means cut to have a relatively large change of frequency with temperature change near said nominal operating temperature;
said second crystal means cut to have a relatively small change of frequency with temperature change near said nominal operating temperature;
said first and second crystals being located within said oven;
phase detector means; means connecting said phase detector means to said first and second oscillator means; said phase detector means disposed to be responsive to the output signal frequencies of said first and second crystal oscillator means to produce an output signal indicative of the relative magnitudes of said output signal frequencies;
control means connected to said phase control means and responsive to said output signal to control the energy supplied to said heater element to maintain the temperature of said oven at said nominal operating temperature.

2. Frequency controlled oven means in accordance with claim 1 in which:
said first crystal means is an A–C cut crystal;
and said second crystal means is an A–T cut crystal.

3. Frequency controlled oven means in accordance with claim 1 in which:
said phase detector means is responsive to the phase relation of the output signals of said first and second oscillator means to produce an output signal having a D-C component whose polarity is indicative of the phase relation of said output signals;
and in which said control means further comprises D-C amplifier means responsive to said D-C component to supply to said heater element a current of a magnitude to cause said oven temperature to continuously move toward said nominal operating temperature.

4. Frequency controlled oven means having a nominal operating temperature and comprising:
an oven with a heating means;
first and second oscillator means comprising first and second crystal means, respectively, located within said oven;
said first and second crystal means being cut to have a large frequency rate of change of frequency and a small rate of change of frequency, respectively, with temperature changes near said nominal operating temperature;
signal control means comprising phase detecting means responsive to the output signal frequency means of said first and second oscillator means to regulate the energy supplied to said heating means to maintain the oven at said nominal operating temperature.

5. Frequency controlled oven means in accordance with claim 4 in which:
said first crystal means is an A–C cut crystal;
and said second crystal means is an A–T cut crystal.

6. Frequency controlled oven means in accordance with claim 4 in which:
said phase detector means is responsive to the phase relations of the output signals of said first and second oscillator means to produce an output signal having a D-C component whose polarity is indicative of the phase relation of said output signals;
and in which said signal control means further comprises D-C amplifier means responsive to said D-C component to supply to said heater element a heater current of a magnitude to cause said oven temperature to continuously move toward said nominal operating temperature.

References Cited

UNITED STATES PATENTS

| | | | |
|---|---|---|---|
| 2,843,714 | 7/1958 | Stanton | 219—494 |
| 3,158,821 | 11/1964 | Sulzer | 219—494 |

BERNARD A. GILHEANY, Primary Examiner

F. E. BELL, Assistant Examiner

U.S. Cl. X.R.

331—116